United States Patent [19]

Yoshioka et al.

[11] 4,420,588

[45] Dec. 13, 1983

[54] WATER-ABSORBING RUBBER COMPOSITION

[75] Inventors: Yoshihiro Yoshioka; Hiroshi Harima, both of Ibaraki, Japan

[73] Assignee: Kuraray Company Limited, Kurashiki, Japan

[21] Appl. No.: 329,437

[22] Filed: Dec. 10, 1981

[30] Foreign Application Priority Data

Dec. 24, 1980 [JP] Japan .............................. 55-184418

[51] Int. Cl.³ .............................................. C08L 9/00
[52] U.S. Cl. ....................................... 525/93; 525/95; 525/98; 525/122; 525/184
[58] Field of Search .................... 525/93, 95, 98, 122, 525/184

[56] References Cited

FOREIGN PATENT DOCUMENTS 54-94525  7/1979  Japan .
54-110262 8/1979  Japan .

*Primary Examiner*—Allan Lieberman

*Attorney, Agent, or Firm*—Oblon, Fisher, Spivak, McClelland & Maier

[57] ABSTRACT

A water-absorbing rubber composition comprising (A) a 1,3-diene rubber with a crystal or glass region content as measured at an ordinary temperature of 5–50% and (B) a highly water-absorbing resin dispersed in the said rubber, the said highly water-absorbing resin being a product of crosslinking of a polymer which contains as monomer component thereof at least 40 mole percent of an $\alpha,\beta$-unsaturated compound containing 1 or 2 groups each selected from the class consisting of a carboxyl group and a group convertible to a carboxyl group with at least one crosslinking agent selected from the class consisting of a polyfunctional epoxy compound and a polyamine, the resin being in the form of a powder capable of passing through a 20-mesh Tyler screen and absorbing 20–500 times its own weight of distilled water. The composition can absorb water rapidly and produce a high swelling pressure, and has good durability in the swollen state.

18 Claims, 2 Drawing Figures

WATER-ABSORBING RUBBER COMPOSITION

BACKGROUND OF THE INVENTION

1. Field of the Art

This invention relates to a water-absorbing rubber composition comprising (A) a 1,3-diene rubber with a crystal or glass region content as measured at an ordinary temperature of 5–50% and (B) a highly water-absorbing resin dispersed in said rubber, said resin being in the form of a powder capable of passing through a 20-mesh Tyler screen and absorbing 20–500 times its own weight of distilled water. The composition can rapidly absorb water and show a high swelling pressure with excellent durability in the highly swollen state (ability to maintain a high swelling pressure for a long period of time), and is therefore especially useful as a water leak stopper or sealant to which a high swelling pressure is essential.

2. Description of the Prior Art

Compositions wherein a natural or synthetic rubber is mixed with a water-soluble polymer, which serves as a water-absorbing substance, such as polyvinyl alcohol, polyacrylic acid carboxymethylcellulose or hydroxyethylcellulose, are known. Such compositions can absorb water, whereupon they are swollen. Therefore, they are useful as water leak stoppers. However, since the water-absorbing substance used therein is water-soluble, the said compositions cannot be swollen to a high degree, hence can hardly produce a sufficient swelling pressure as required for the use as water leak stoppers, for instance. They cannot produce an early water-leak-stopping effect because of slow rates of water absorption. Attempts to use them as water leak stoppers in the practice consequently have encountered a number of difficulties.

Compositions for use as water leak stopper, wherein a water absorbing resin such as a polyurethane resin prepared from an isocyanate prepolymer is mixed with a natural or synthetic rubber are also know from the disclosure of Japanese Patent Applications laid open under Kokai Nos. 78-143,653, 79-7,461, 79-7,463 and 79-20,066, for instance. Also, Japanese Patent Application Kokai No. 78-30,654, for instance, discloses the use as a water leak stopper of a reaction product from an isocyanate prepolymer and a water-soluble polymer such as polyvinyl alcohol or polyacrylic acid. However, the compositions disclosed in the patent specifications cited above are not practical because they can swell in water at most three times, that is only to an insufficient extent for their use as water leak stoppers.

For eliminating the drawbacks as mentioned above, more recent Japanese Patent Applications Kokai Nos. 79-94,525 and 79-110,262 propose the use as water-absorbing substance of a highly water-absorbing resin capable of absorbing 10–200 times its own weight of water, which resin is incorporated into a rubber such as acrylic rubber, styrene-butadiene rubber (SBR), butadiene rubber, nitrile rubber, butyl rubber, or natural rubber, to give a water-absorbing rubber composition allegedly usable as a water leak stopper. However, such compositions cannot produce a high swelling pressure. Hence, the practical use thereof as a water leak stopper is still accompanied by a number of difficulties. Since the rubber used in the said composition is noncrystalline at an ordinary temperature, the rubber, when in the unvulcanized state, is subject to cold flow under a relatively weak external force. It is supposed that, even when the highly absorbing resin incorporated in said composition absorbs water and swells, the cold flow property of the rubber itself prevents production of a sufficient swelling pressure at the place to be sealed. It is also supposed that, even when the said composition is subjected to crosslinking, for example by vulcanization, to an extent sufficient to prevent cold flow, the network of crosslinked rubber molecules prevents swelling of the highly absorbent resin, so that a sufficient swelling pressure cannot be produced.

Japanese Patent Applications Kokai Nos. 80-131,035, 80-131,041 and 80-131,080 disclose the use as a packing material, for instance, of a composition prepared by mixing a natural or synthetic rubber or resin with a saponified starch-acrylonitrile copolymer, which is a highly water-absorbing resin. However, the said composition has a drawback in that its poor durability in the swollen state, supposedly due to the use of the said starch-derived highly absorbent resin, makes prolonged use of the composition impossible. When other resins than elastomers such as rubber are used, swelling by water absorption does not take place due to hardness or rigidity of the resins. Finally, Japanese Patent Application Kokai No. 80-99,986 discloses a composition prepared by mixing a rubber component with a hydrophilic resin comprising a (polystyrene)-(modified polybutadiene rendered hydrophilic by reaction with an anionic or cationic group-containing compound)-(polystyrene) type block copolymer, or a hydrophilic resin produced by a copolymerizing at least one hydrophilic monomer such as acrylic acid or an ester thereof with a polyol diacrylate. However, the use of the former hydrophilic resin as a highly water-absorbing resin results in production of a low swelling pressure as compared with the degree of swelling obtained when the latter hydrophilic resin is immersed in water, whereas the use of the latter hydrophilic resin results in an unsatisfactory degree of durability in the immersed and swollen state.

SUMMARY OF THE INVENTION

The present invention eliminates the drawbacks of the above-mentioned prior art water-absorbing rubber compositions. A primary object of the invention is to provide a water-absorbing rubber composition capable of absorbing water rapidly and thereby producing a high swelling pressure, said composition also having a sufficient durability in the highly swollen state (ability to maintain a high swelling pressure for a long period of time). Another object is to provide a method of producing said composition in an easy and simple manner.

In accordance with the present invention, the above objects are achieved by providing a water-absorbing rubber composition comprising (A) a 1,3-diene rubber with a crystal or glass region content as measured at an ordinary temperature of 5–50% and (B) a highly water-absorbing resin dispersed in said rubber, said highly water-absorbing resin being a product of crosslinking of a polymer which contains as monomer component thereof at least 40 mole percent of an $\alpha,\beta$-unsaturated compound containing 1 or 2 groups each selected from the group consisting of a carboxyl group and a group convertible to a carboxyl group with a polyfunctional epoxy compound or a polyamine as a crosslinking agent, said resin being in the form of a powder capable of passing through a 20-mesh Tyler screen and capable of absorbing 20–500 times its own weight of distilled water (absorptive capacity). The absorptive capacity is calculated by dividing the weight of distilled water absorbed by the highly water-absorbing resin by the weight of the said resin in the dry state.

As compared with the prior art water-absorbing rubber compositions including a composition comprising a natural or synthetic rubber and a water-soluble polymer having a low absorptive capacity, or a composition comprising a noncrystalline rubber and a highly water-absorbing resin, and crosslinked products therefrom, the composition in accordance with the present invention, as mentioned above, absorbs water at a very high rate, produces a high swelling pressure, and shows good durability. It is a characteristic feature of the composition of the invention that those effects are scarcely reduced by a slight degree of crosslinking (vulcanization) of the composition. It should be emphasized that these advantages are essentially given by the combination of the specific rubber mentioned above and the highly water-absorbing resin specified in the above.

BRIEF DESCRIPTION OF THE DRAWING

In the accompanying drawing, In FIG. 1, the solid line is for the water-absorbing rubber composition of Example 1 comprising chloroprene rubber and a highly water-absorbing isobutylene-maleic anhydride copolymer resin, the dot-and-dash line for the water-absorbing rubber composition of Example comprised a styrene-butadiene block copolymer rubber and a highly water-absorbing isobutylene-maleic anhydride copolymer resin, the dotted line for the water-absorbing rubber of Comparative Example 1 comprised butyl rubber and a highly water-absorbing isobutylene-maleic anhydride resin.

In FIG. 2, the solid line is for the water-absorbing rubber composition of Example 11 comprised chloroprene rubber and a highly water-absorbing sodium polyacrylate resin, and the dotted line for the water-absorbing rubber composition of Comparative Example 2 comprised chloroprene rubber and sodium polyacrylate (water-soluble polymer).

DETAILED DESCRIPTION OF THE INVENTION

Figure 1:
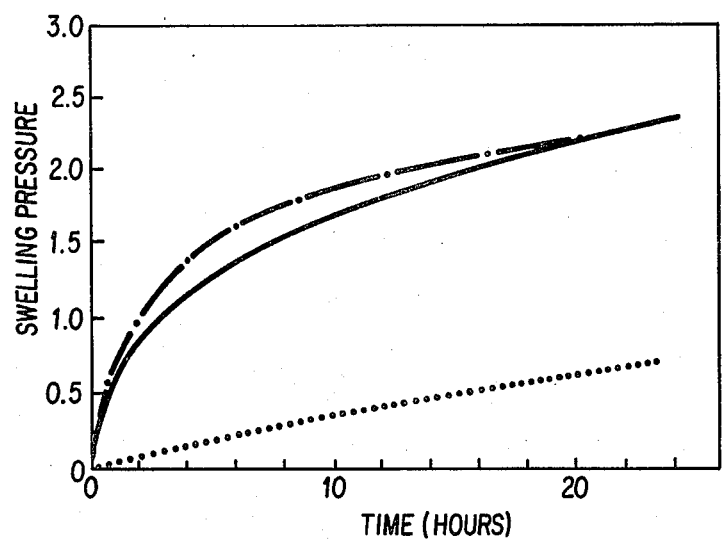
FIG. 1 shows a function of time the swelling pressure produced by a sheet made of a water-absorbing rubber composition prepared in each of Example 1, Example 4 and Comparative Example 1.

When the crystal or glass region content of the 1,3-diene rubber is less than 5%, a sufficient swelling pressure cannot be obtained because cold flow of the rubber takes place before completion of swelling of the water-absorbing rubber composition. When crosslinks are introduced into the rubber for the purpose of inhibiting cold flow, swelling of the highly water-absorbing resin with water is prevented by the crosslinked structure, so that a sufficient absorptive capacity and a sufficient swelling pressure cannot be obtained. On the other hand, when the crystal or glass region content of the above-mentioned rubber exceeds 50%, the rubber becomes too hard to give a water-absorbing rubber composition capable of showing a high rate of water-absorption and a high swelling pressure; said composition is poor in processability in application thereof as a water leak stopper, for instance. Accordingly, it is required in the practice of the present invention that the 1,3-diene rubber has a crystal or glass region content of 5-50%, preferably 15-35%.

That rubber which can have such specific structure includes crystalline rubbers produced from a compound having a substituted or unsubstituted 1,3-butadiene skeleton with carbon-carbon double bonds at positions 1 and 3, such as 1,3-butadiene, 2-methyl-1,3-butadiene (isoprene), 2,3-dimethyl-1,3-butadiene or 2-chloro-1,3-butadiene (chloroprene), as well as block copolymers composed of one or more noncrystalline rubber-like polymer segments, each consisting of the above-mentioned 1,3-butadiene skeleton-containing compound, and one or more glass-like polymer segments.

Examples of the above-mentioned crystalline rubbers are chloroprene rubber, synthetic trans-1,4-polyisoprene, gutta percha, balata, and other crystalline polymers substantially constituted by single component repeating units. Among them, chloroprene rubber is preferable in view of swellability of the resulting water-absorbing rubber composition. The crystalline rubbers preferably have a molecular weight of 50,000 to 1,000,000, and a melting point of the crystal regions of 20°-90° C. The concept of "crystalregion" of a 1,3-diene rubber as used herein is well recognized in the art, and the method of determination of the same is also well known (see, for example, Papers on Kobunshi Ronbunshu, vol. 31, pages 138–139).

Example of the above-mentioned block copolymers are block copolymer rubbers prepared from a 1,3-diene, such as 1,3-butadiene or 2-methyl-1,3-butadiene (isoprene), and a monovinyl-substituted aromatic compound capable of giving polymers which are glass-like at an ordinary temperature, such as styrene, alpha-methylstyrene or vinyl-toluene. Whereas such block copolymer rubbers may be of various types, block copolymer rubbers of the type A-B-A, wherein A is a polymer segment composed of a monovinyl-substituted aromatic compound and preferably having a glass transition temperature of at least 70° C. and having a degree of polymerization of 10-2,500 and B is a noncrystalline polymer segment composed of a 1,3-diene and preferably having a degree of polymerization of 500-15,000, are preferred. Hydrogenation products of such block copolymer rubbers are also usable.

The glass region content of 5-50% which the block copolymer rubber to be used in the practice of the invention should have can be attained by adjusting, in preparing the said block copolymer rubber, the monovinyl-substituted aromatic polymer/1,3-diene polymer ratio to 5-50%.

Among the said 1,3-diene rubbers, chloroprene rubber having a crystal region content of 15-35% is especially preferred, since it gives a water-absorbing rubber composition with a high swellability.

As regards the highly water-absorbing resin to be used in the practice of the invention, when the absorptive capacity of the said resin is too small, the swellability of the resulting water-absorbing rubber composition becomes small. Conversely, when the absorptive capacity is too high, the strength of the resin in the swollen state becomes insufficient. In both the cases, a sufficient swelling pressure cannot be attained. Therefore, a water leak stopper or sealant prepared from a composition containing such a highly water-absorbing resin will produce only an insufficient water leak stopping effect. From this viewpoint, the water-absorbing resin to be used in the practice of the invention is required to have an absorptive capacity of 20–500 times its own weight, preferably 50–300 times.

From the viewpoint of water-absorbing capacity and durability of the resulting water-absorbing rubber composition, preferred is a product of crosslinking of a polymer which contains as monomer component thereof an $\alpha,\beta$-unsaturated compound containing 1 or 2 groups each selected from the class consisting of a carboxyl group and a group convertible to a carboxyl group, such as a carboxylic acid salt group, a carboxylic acid amide group, a carboxylic acid imide group or a carboxylic acid anhydride group, with a polyfunctional epoxy compound or polyamine as crosslinking agent.

The above-mentioned, $\alpha,\beta$-unsaturated compound is, for example, acrylic acid, methacrylic acid, acrylamide, methacrylamide, maleic anhydride, maleic acid, maleinamide, maleinimide, itaconic acid, crotonic acid, fumaric acid or mesaconic acid, and may be used in combination with such a copolymerizable monomer as an alpha-olefin, a vinyl compound or a vinylidene compound, for example, ethylene, propylene, isobutylene, 1-butylene, diisobutylene, methyl vinyl ether, styrene, vinyl acetate, acrylic acid ester, methacrylic acid ester or acrylonitrile, so far as the characteristics required of the resulting highly water-absorbing resin can be obtained. When used in combination with such a comonomer, the $\alpha,\beta$-unsaturated compound containing a carboxyl group or a group convertible to a carboxyl group preferably amounts to at least 40 mole percent of the total monomer components.

The above-mentioned polymer which contains as a monomer component thereof an $\alpha,\beta$-unsaturated compound containing a carboxyl group or a group convertible to a carboxyl group can be prepared by a conventional method using a radical polymerization catalyst. The degree of polymerization thereof is not particularly limited but is preferably 10–10,000.

Among the polymers which can be prepared in the manner mentioned above, preferred are polymers of acrylic acid, methacrylic acid and so forth, and copolymers of an alpha-olefin or vinyl compound with maleic anhydride. These polymers or copolymers may preferably be made more hydropholic by reaction with a basic substance such as an hydroxide, oxide or carbonate of an alkali or alkaline earth metal such as sodium, potassium, magnesium, calcium or barium, or with a basic substance such as ammonia or a monoamine. The said reaction may be carried out, for example, by dissolving the above-mentioned polymer in a solvent, preferably water, and then adding with stirring an alkali or alkaline earth metal comound, ammonia, or monoamine, for instance. In such reaction, sodium hydroxide, potassium hydroxide and ammonia are preferably used in view of their reactivity and the durability of the resulting highly water-absorbing resins.

The thus-obtained polymers containing as monomer component thereof an $\alpha,\beta$-unsaturated compound are subjected to a crosslinking reaction with a polyfunctional epoxy compound or a polyamine. By the "polyfunctional epoxy compound" is meant a compound which contains at least two epoxy groups in its molecule, typically glycerol diglycidyl ether, ethylene glycol diglycidyl ether, polyethylene glycol diglycidyl ether, glycerol triglycidyl ether, propylene glycol diglycidyl ether, polypropylene glycol diglycidyl ether or trimethylolpropane triglycidyl ether. The said polyamine includes water-soluble polamine having a molecular weight of 60–5,000 and represented by the general formula $H-(NH-CH_2-CH_2-)_nNH_2$ wherein n is an integer of 1 to 110, such as ethylenediamine, diethylenetriamine, triethylenetetramine, tetraethylenepentamine, pentaethylenehexamine, and straight-chained or branched-chained polyethyleneimine. These polyamines are preferred from the viewpoint of durability of the resulting water-absorbing rubber compositions.

The crosslinking reaction is carried out by adding the above-mentioned crosslinking agent to a polymer containing as monomer component thereof the above-mentioned $\alpha,\beta$-unsaturated compound. The crosslinking reaction may be carried out with heating or with the use of a solvent. The reaction is preferably carried out with heating and in the presence of water. The reaction product obtained in such a case is preferably dried or heat-treated. The degree of crosslinking can be adjusted by selecting an adequate amount of the crosslinking agent to give a highly water-absorbing resin having a desired absorptive capacity.

Preferred examples of the highly water-absorbing resin to be used in the practice of the invention are the following:

(1) Crosslinked products prepared by reacting a copolymer of maleic acid or a derivative thereof such as maleic anhydride, maleinamide or maleinimide and a straight- or branched-chained alpha-olefin containing 2–12, preferably 2–8, carbon atoms, such as ethylene, propylene, butylene, isobutylene or diisobutylene, with an alkali or alkaline earth metal compound, ammonia or a monoamine, for instance, and then crosslinking the reaction product with a polyfunctional epoxy compound or a polyamine;

(2) Crosslinked products prepared by reacting a copolymer of maleic acid or a derivative thereof and a vinyl or vinylidene compound, such as styrene, vinyl acetate, methyl vinyl ether, acrylic acid ester, methacrylic acid ester or acrylonitrile, with an alkali or alkaline earth metal compound, ammonia or an monoamine, for instance, and then crosslinking the reaction product with a polyfunctional epoxy compound or a polyamine;

(3) Crosslinked products prepared by reacting an acrylic or methacrylic acid polymer with an alkali or alkaline earth metal compound, ammonia or a monoamine, for instance, and then crosslinking the reaction product with a polyfunctional epoxy compound or a polyamine; and (4) Crosslinked products prepared by reacting a copolymer of acrylic or methacrylic acid and a vinyl or vinylidene compound mentioned above in (2) with an alkali or alkaline earth metal compound, ammonia, a monoamine or the like and then crosslinking the reaction product with a polyfunctional epoxy compound or a polyamine.

Among those mentioned above, the crosslinked products prepared by reacting a maleic anhydride-containing copolymer with a basic substance and then crosslinking the reaction product with a polyfunctional eopxy compound or a polyamine, namely the crosslinked products mentioned above in (1) and (2) are preferred from the viewpoint of a absorbing capacity and a durability. Especially preferred are crosslinked products prepared by reacting an alternating copolymer of isobutylene and maleic anhydride with sodium hydroxide or ammonia and then crosslinking the reaction product with polyethyleneimine.

The thus-produced highly water-absorbing resin is preferably crushed or comminuted so as to give a powder capable of passing through a 20-mesh Tyler screen.

Particles constituting such a powder are not greater than about 840 microns. Larger particle sizes frequently cause uneven swelling of the water-absorbing rubber composition or loss of surface smoothness of the composition.

The water-absorbing rubber composition in accordance with the invention can be produced by mixing and kneading the above-mentioned 1,3-diene rubber and the highly water-absorbing resin in a conventional manner using such a mixing apparatus as a roll mill, Banbury mixer or kneader. The composition can also be produced by dissolving or dispersing the rubber component to be used in accordance with the invention in an adequate solvent and mixing the resulting rubber solution or dispersion with the highly water-absorbing resin. In the latter case, a solvent-containing composition is obtained, and this is suitable for use in producing paint or putty compositions.

In the practice of the invention, the mixing ratio of the above-mentioned 1,3-diene rubber to the highly water-absorbing resin may be selected depending on the desired absorptive capacity of the composition, and generally 10–300 parts by weight, preferably 50–200 parts by weight, of resin is used per 100 parts by weight of rubber. In mixing the rubber and highly absorbing resin, there may be added an antioxidant, antiozonant, ultraviolet absorber, dye and/or pigment. Other rubber species, water-soluble polymer, rubber reinforcing agent, rubber softening agent, plasticizer, tackifier resin and/or filler may be added in such amounts that the object of the invention is not defeated. A vulcanizing agent, vulcanization accelerator, accelerator activator and/or other vulcanization chemicals or the crosslinking agent may also be added to the water-absorbing rubber composition if the effects of the invention are not unduly weakened. The amount of those vulcanization chemicals or crosslinking agent is ordinary less than 10 parts per 100 parts by weight of the rubber.

The water-absorbing rubber composition obtained in this manner is formed into a desired form, such as a sheet, slab, stick or rod, for its practical application by adhesion, winding around or filling, for instance. The composition is also applied in the form of a solution or dispersion, in the form of putty which is suited for filling up crevices or openings, or as necessary in the form of a coating on a supporting body such as cloth or net. The uses of the composition includes diaper, disposable dustcloth, soil conditioner, water leak stopper, and dew condensation inhibitor, among others. The composition is especially suited for use as a water leak stopper where a high swelling pressure is required.

The following examples will illustrate the invention in more detail. However, they are by no means limitative of the invention. In the Examples and Comparative Examples, "part(s)" are, unless otherwise stated, "part(s) by weight".

EXAMPLE 1

A homogeneous aqueous solution of sodium salt of isobutylene-maleic anhydride copolymer was prepared by stirring a mixture of 100 parts of isobutylene-maleic anhydride copolymer (Kuraray Isoprene Chemical Corporation's ISOBAN ®-10; alternating copolymer with a molar ratio of isobutylene to maleic anhydride of 1:1; molecular weight about 160,000), 42 parts of sodium hydroxide and 260 parts of water at 90° C. Then, 1.5 parts of glycerol diglycidyl ether with an epoxy equivalent of 145 was added to the aqueous solution to give a homogenous mixture. This mixture was applied to a chromium-plated iron sheet maintained at about 90° C., and the coated sheet was dried. The thus-obtained film was comminuted to a powder capable of passing through a 20-mesh screen. The powder was further heat-treated in an air oven at 120° C. to give a highly water-absorbing resin powder. The absorptive capacity of the resin was about 130 times its own weight of water.

A water-absorbing rubber composition was prepared by mixing and kneading on an 8-inch open roll mill 100 parts of chloroprene rubber (Neoprene ® W; Showa Neoprene K. K.) having a crystal region content at 25° C. (hereinafter also referred to as crystallinity) of 18% with 150 parts of the above highly water-absorbing resin powder.

The above composition was formed into an about 3 mm thick sheet by hot pressing. A square test specimen (2.5 cm × 2.5 cm) was cut out from the sheet, put between two stainless steel plates held 3 mm apart from each other, and immersed in distilled water, and the swelling pressure produced by water absorption by the rubber composition was measured. The results of the measurement are shown in FIG. 1, in which the solid line is for the water-absorbing rubber composition of this example. As is evident in FIG. 1, the above rubber composition was swollen rapidly and thereby produced a high swelling pressure.

Comparative Example 1

A water-absorbing rubber composition was prepared by the procedure of Example 1 except that butyl rubber (Japan Synthetic Rubber's JSR ® Butyl 035) was used as the rubber component. The butyl rubber used contained no crystal or glass region at 25° C.

The above rubber composition was formed into a sheet and the swelling pressure was measured in the same manner as in Example 1. The results of the measurement are shown in FIG. 1 by a dotted line. As is evident in FIG. 1, the rubber composition of this comparative example showed a slower increase in swelling pressure as compared with the rubber composition of Example 1, but did not show a sufficient swelling pressure. This rubber composition, even after introduction of crosslinks by vulcanization, did not give a sufficient swelling pressure.

EXAMPLE 2

Nine kinds of powdery, water-absorbing resin different in absorptive capacity were prepared by the procedure described in Example 1 for producing the highly water-absorbing resin powder, but varying the amount of glycerol diglycidyl ether. Each powder wholly passed through a 20-mesh screen.

Nine water-absorbing rubber compositions (No. a to No. i) were prepared by mixing and kneading 150 parts of each of the above-mentioned powdery, water-absorbing resins with 100 parts of chloroprene rubber (Showa Neoprene's Neoprene ® AD) having a crystal region content at 25° C. of 30%.

For each of the compositions, swelling pressure measurement was performed in the same manner as in Example 1. The swelling pressure values obtained after 24 hours of immersion are shown in Table 1.

TABLE 1

| No. | a | b | c | d | e | f | g | h | i |
|---|---|---|---|---|---|---|---|---|---|
| Absorptive | 10 | 20 | 50 | 100 | 200 | 300 | 400 | 500 | 600 |

TABLE 1-continued

| No. | a | b | c | d | e | f | g | h | i |
|---|---|---|---|---|---|---|---|---|---|
| capacity of water-absorbing resin (times) | | | | | | | | | |
| Swelling pressure exhibited by sheet after 24 hours (kg/cm$^2$) | 0.7 | 1.5 | 2.2 | 2.5 | 2.3 | 2.0 | 1.6 | 1.3 | 0.5 |

As is evident in Table 1, when the absorptive capacity of the highly water absorbing resin used was less than 20 times or more than 500 times, a water-absorbing rubber composition capable of showing a sufficient swelling pressure could not obtained, whereas, when the absorptive capacity of the resin used was within the range of 20–500 times, especially within the range of 50–300 times, a water-absorbing rubber composition capable of showing a sufficient swelling pressure could be obtained.

EXAMPLE 3

Various chloroprene rubber species with different degrees of crystallinity as shown in Table 2 were prepared by polymerizing monomeric chloroprene by a conventional method but varying the polymerization temperature within the range of from −40° C. to 90° C. Compositions (No. j to No. p) were prepared by mixing and kneading 100 parts of each rubber species with 150 parts of the highly water-absorbing resin powder prepared in Example 1 (absorptive capacity 130 times; wholly passing through a 20-mesh screen). Each composition was formed into a 3 mm thick sheet, and swelling pressure measurement was carried out in the same manner as in Example 1. The swelling pressure data obtained after 24 hours of immersion in distilled water are shown in Table 2.

TABLE 2

| No. | j | k | l | m | n | o | p |
|---|---|---|---|---|---|---|---|
| Crystallinity of chloroprene rubber (%) | 0 | 6 | 18 | 30 | 40 | 50 | 60 |
| Swelling pressure exhibited by sheet after 24 hours (kg/cm$^2$) | 0.5 | 1.3 | 2.1 | 2.7 | 1.6 | 1.0 | 0.7 |

EXAMPLE 4

A water-absorbing rubber composition was prepared by the procedure of Example 1 except that the rubber component used was a polystyrene-polybutadiene-polystyrene type block copolymer rubber (Kraton® 1101 with a polystyrene content of 35%; Shell Chemical Co.).

For the above rubber composition, swelling pressure measurement was conducted by the procedure of Example 1. The results of the measurement are shown in FIG. 1 by a dot-and-dash line. The above rubber composition, like the water-absorbing rubber composition of Example 1, rapidly absorbed water and thereby showed a high swelling pressure.

EXAMPLE 5

In 250 parts of water, there were dissolved 100 parts of a methyl vinyl ether-maleic anhydride copolymer (alternating copolymer of methyl vinyl ether and maleic anhydride; GAF Corporation's GANTREZ® AN-139) and 51 parts of sodium hydroxide. Then, 1.2 parts of glycerol diglycidyl ether with an epoxy equivalent of 145 was added, and the mixture was stirred. From this mixture, there was prepared by the procedure of Example 1 a highly water-absorbing resin powder capable of passing a 20-mesh screen. The absorptive capactiy was 200 times.

A water-absorbing rubber composition was prepared by mixing and kneading 100 parts of the above highly water-absorbing resin powder with 100 parts of chloroprene rubber (Showa Neoprene's R Neoprene® AD) having a crystallinity of 30%. Using the composition, a 3 mm thick sheet was prepared, and tested for the swelling pressure by the method of Example 1. The swelling pressure as measured after 24 hours of immersion in distilled water was 1.63 kg/cm$^2$.

EXAMPLE 6

Using the highly water-absorbing resin and chloroprene rubber as used in Example 1, a vulcanizable, water-absorbing rubber composition was prepared according to the recipe given below in Table 3, and vulcanized by hot pressing at 150° C. to give a 3 mm thick sheet. Square test specimens (2.5 cm × 2.5 cm) were cut out from the sheet.

TABLE 3

| Ingredient | Amount |
|---|---|
| Chloroprene rubber | 100 parts |
| Zinc oxide (#1) | 5 parts |
| Magnesium oxide | 4 parts |
| Stearic acid | 1 part |
| Ethylenethiourea | 0.5 part |
| High water-absorbing resin powder | 100 parts |
| Antioxidant (2,2'-methylene-bis-(4-methyl-6-tert-butylphenol)) | 2 parts |

By the test procedure of Example 1, one of the test specimens was immersed in distilled water and the swelling pressure after 24 hours was measured. The swelling pressure was 1.75 kg/cm$^2$.

Another test specimen was immersed in distilled water at 40° C., and tested for changes in its weight and thickness each as a function of time. The results obtained are shown in Table 4. The weight and thickness of the test specimen before immersion were respectively assigned a value of 1 for convenience.

TABLE 4

| Days or months of immersion | Before | Days | | | | | Months | | |
|---|---|---|---|---|---|---|---|---|---|
| | | 1 | 3 | 7 | 14 | 30 | 3 | 6 | 12 |
| Change in weight | 1 | 2.6 | 4.4 | 7.0 | 8.5 | 9.2 | 9.2 | 9.2 | 8.5 |
| Change in thickness | 1 | 1.7 | 1.9 | 2.1 | 2.3 | 2.5 | 2.5 | 2.5 | 2.0 |

The data in Table 4 indicate that swelling had arrived at a state of saturation in about 30 days and that the test specimen had a sufficient degree of durability in the swollen state at least for 6 months although a tendency toward decrease in both weight and thickness of the test specimen was noted after 12 months.

EXAMPLE 7

A homogeneous aqueous solution was prepared by mixing 100 parts of an isobutylene-maleic anhydride copolymer (Kuraray Isoprene Chemical's ISOBAN®-10; alternating copolymer of isobutylene and maleic anhydride in a molar ratio of 1:1; molecular weight about 160,000), 42 parts of sodium hydroxide and 258 parts of water, followed by heating at 90° C. with stirring for 6 hours. To the solution was added 0.45 part of polyethyleneimine (Polyethyleneimine SP-012; Nippon Shokubai Kogyo Co., Ltd.) having a molecular weight of about 1,200. After sufficient stirring, the mixture was applied to a chromium-plated iron sheet maintained at about 90° C., and the coated sheet was dried. The film thus produced was pulverized to a powder capable of passing through a 20-mesh screen. The powder was further heat-treated in an air oven at 120° C. The highly water-absorbing resin powder obtained showed an absorptive capacity of about 140 times.

Using the above highly water-absorbing resin as the highly water-absorbing resin component and chloroprene rubber having a crystallinity of 18% as the rubber component, a vulcanizable composition was prepared according to the recipe hereinabove in Table 3, and vulcanized by hot pressing at 150° C. to give a 3 mm thick sheet. For various tests, square test specimens (2.5 cm × 2.5 cm) were cut out from the sheet.

By the test procedure of Example 1, the swelling pressure attained after 24-hour immersion of the test specimen in distilled water was measured. The swelling pressure was 1.9 kg/cm$^2$.

Another test specimen was immersed in distilled water at 40° C., and examined for changes in its weight and thickness each as a function of time. The initial weight and thickness of the test specimen were each regarded as 1. The results of this test are shown in Table 5.

TABLE 5

| Day or months of immersion | Before | Days | | | | | Months | | |
|---|---|---|---|---|---|---|---|---|---|
| | | 1 | 3 | 7 | 14 | 30 | 3 | 6 | 12 |
| Change in weight | 1 | 2.7 | 4.5 | 7.2 | 8.6 | 9.4 | 9.4 | 9.4 | 9.4 |
| Change in thickness | 1 | 1.8 | 2.0 | 2.3 | 2.5 | 2.6 | 2.6 | 2.6 | 2.6 |

It is seen from Table 5 that the test specimen reached at state of saturated swelling after about 30 days of immersion, which state continued through 12 months. Good durability of the test specimen in the swollen state was thus demonstrated. It is also seen that the use of the highly water-absorbing resin obtained by crosslinking with the polyamine (polyethyleneimine) in this example produced better results in respect of 12-month durability as compared with the use in Example 1 of the highly water-absorbing resin obtained by crosslinking of the isobutylene-maleic anhydride copolymer with the polyfunctional epoxy compound.

EXAMPLE 8

A highly water-absorbing resin powder capable of wholly passing through a 20-mesh screen was prepared by the procedure of Example 7 except that 0.40 part of tetraethylenepentamine was used as a crosslinking agent in place of 0.45 part of polyethyleneimine with a molecular weight of about 1,200. The highly water-absorbing resin had an absorptive capacity of about 150 times.

A water-absorbing rubber composition was prepared by mixing and kneading the above highly water-absorbing resin powder, chloroprene rubber having a crystallinity of 18% and other ingredients according to the vulcanizate recipe shown in Table 3, and vulcanized by hot pressing at 150° C. to give a 3 mm thick sheet.

Square test specimens (2.5 cm × 2.5 cm) were cut out from the above sheet, immersed in distilled water at 40° C., and examined for changes in weight and thickness thereof as in Example 6. The results obtained are shown in Table 6. As is evident from the table, the above sheet had a sufficient degree of durability in the swollen state.

TABLE 6

| Days or months of immersion | Before | Days | | | | | Months | | |
|---|---|---|---|---|---|---|---|---|---|
| | | 1 | 3 | 7 | 14 | 30 | 3 | 6 | 12 |
| Change in weight | 1 | 3.0 | 4.7 | 7.5 | 8.8 | 9.7 | 9.7 | 9.7 | 9.7 |
| Change in thickness | 1 | 1.9 | 2.2 | 2.5 | 2.6 | 2.9 | 2.9 | 2.9 | 2.9 |

EXAMPLE 9

Following the procedure of Example 1, but varying, in accordance with the indication given in Table 7, the amount of the highly water-absorbing resin powder per 100 parts of chloroprene rubber (crystallinity of 18%), water-absorbing rubber compositions (No. q to No. u) were prepared and respectively formed into sheets. The sheets were immersed in distilled water and examined for the swelling pressure after 24 hours. The results of the swelling pressure measurement are shown in Table 7.

TABLE 7

| No. | q | r | s | t | u |
|---|---|---|---|---|---|
| Parts of highly water-absorbing resin per 100 parts of rubber | 10 | 50 | 100 | 200 | 300 |
| Swelling pressure exhibited by sheet after 24-hour immersion (kg/cm$^2$) | 1.0 | 1.7 | 1.9 | 2.7 | 2.5 |

EXAMPLE 10

A specified amount of styrene monomer was polymerized in cyclohexane at 50° C. in the presence of n-butyllithium as catalyst. Then, a specified amount of isoprene monomer was added and allowed to polymerize, and thereafter again styrene monomer was added and allowed to polymerize. After completion of polymerization, 1 part of an antioxidant (dibutylhydroxytoluene) per 100 parts of the polymer was added, and then steam was passed through the mixture for causing removal of cyclohexane and coagulation of the polymer simultaneously. In this manner, eight A-B-A type block copolymer rubber species differing in styrene content as shown in Table 8 were prepared. In the above formula A-B-A, A is a polystyrene block and B is a polyisoprene block. The glass region contents of those block copolymer rubbers were equal to the respective polystyrene contents.

Water-absorbing rubber compositions were prepared by mixing and kneading 100 parts of each of the above block copolymer rubbers and 150 parts of the highly water-absorbing resin powder as used in Example 1. Those compositions were respectively formed into sheets with a thickness of 3 mm by hot pressing at 100° C.

For each of the above sheets, the swelling pressure after 24-hour immersion was measured by the test method described in Example 1. The results of the measurement are shown in Table 8.

TABLE 8

| Styrene content in block copolymer rubber (%) | Swelling pressure after 24-hour immersion (kg/cm²) |
|---|---|
| 3 | 0.5 |
| 5 | 1.0 |
| 10 | 1.3 |
| 20 | 2.3 |
| 30 | 2.3 |
| 40 | 1.5 |
| 50 | 1.2 |
| 60 | 0.5 |

EXAMPLE 11

A homogeneous aqueous solution was prepared by dissolving 100 parts of polyacrylic acid sodium salt (Aronbis® S; Nippon Junyaku K. K.) in 300 parts of water and adding thereto 2 parts of glycerol diglycidyl ether having an epoxy equivalent of 145. A highly water-absorbing resin powder essentially consisting of a crosslinked polyacrylic acid sodium salt and capable of passing through a 20-mesh screen was prepared by treating the aqueous solution in the same manner as in Example 1. The absorptive capacity of the highly water-absorbing resin was 90 times.

A water-absorbing rubber composition was prepared by mixing and kneading 100 parts of the above highly water-absorbing resin and 100 parts of chloroprene rubber having a crystallinity of 18% by the same method as in Example 1.

Figure 2:
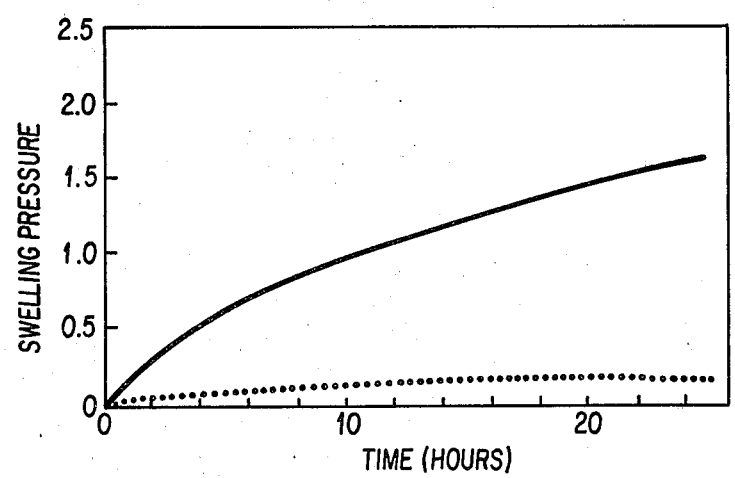
FIG. 2 shows as a function of time the swelling pressure produced by a sheet made of a water-absorbing rubber composition prepared in each of Example 11 and Comparative Example 2.

The rubber composition obtained was formed into a 3 mm thick sheet, and swelling pressure measurement was performed by the method described in Example 1. The results of the measurement are shown in FIG. 2 by a solid line, which indicates that the water-absorbing rubber composition rapidly absorbed water and thereby produced a sufficiently high swelling pressure.

Comparative Example 2

A rubber composition was prepared in the same manner as in Example 11 except that water soluble polyacrylic acid sodium salt (Nippon Junyaku's Aronbis® S) was used in place of the highly water-absorbing resin powder, and swelling pressure measurement was conducted in the same manner as in Example 1. The results of the measurement as shown in FIG. 2 by a dotted line indicate that the composition failed to swell to a sufficient extent and also failed to give a sufficient swelling pressure.

Comparative Example 3

A water-absorbing rubber composition was prepared by the procedure of Example 11 except that the highly water-absorbing resin powder which had been sieved through a 5-mesh screen instead of a 20-mesh screen. The composition was formed into a sheet, and the sheet was subjected to swelling pressure measurement. The measurement was difficult because the rubber composition during measurement swelled out of the steel plates used for the measurement. Swelling out of a rubber composition from such steel plates, the so-called "flowering phenomenon", is a grave problem in practical use thereof.

Comparative Example 4

A vessel fitted with a reflux condenser, which vessel had been purged with nitrogen beforehand, was charged with 546 parts of cyclohexane and 1.1 part of sorbitol monostearate. The mixture was stirred at 50° C. to cause dissolution, and then cooled to room temperature. Thereto was added dropwise an aqueous sodium acrylate-acrylic acid solution prepared by adding dropwise 139 parts of a 25% aqueous sodium hydroxide to 100 parts of acrylic acid, followed whereby about 70% of carboxyl groups present were neutralized, followed by addition of 0.33 part of potassium persulfate (polymerization initiator). The resulting suspension was heated at 50° C. with stirring under reduced pressure (300° torricellian) for 6 hours for polymerization. Thereafter, refluxing was discontinued, and the suspension was evaporated to dryness under reduced pressure to give a highly water-absorbing resin as a powder, which could pass through a 20-mesh screen. Its absorptive capacity was about 500 times. According to the recipe given in Table 3 for Example 6, a water-absorbing rubber composition was prepared by using the above highly water-absorbing resin, and chloroprene rubber having a crystallinity of 18% and other ingredients. Following the procedure of Example 6, a vulcanized sheet having a thickness of about 3 mm was produced, a square test specimens (2.5 cm×2.5 cm) were cut out therefrom for various tests.

In the same manner as in Example 1, one of the test specimens was immersed in water and subjected to swelling pressure measuremnt. The swelling pressure after 24-hour immersion was 1.4 kg/cm².

Another test specimen was immersed in distilled water maintained at 40° C. and examined for changes with time in its weight and thickness. The results obtained are shown in Table 9.

TABLE 9

| Days or months of immersion | Before | Days | | | | | Months | | |
|---|---|---|---|---|---|---|---|---|---|
| | | 1 | 3 | 7 | 14 | 30 | 3 | 6 | 12 |
| Change in weight | 1 | 2.4 | 4.0 | 6.6 | 7.0 | 8.2 | 7.8 | 6.3 | 4.2 |
| Change in thickness | 1 | 1.4 | 1.7 | 1.8 | 2.0 | 2.2 | 2.0 | 1.7 | 1.5 |

As is evident from Table 9, the weight and thickness of the test specimen began to decrease after the lapse of 3 months, hence durability thereof was unsatisfactory.

Having now fully described this invention, it will be apparent to one of oridinary skill in the art that many changes and modifications can be made thereto without departing from the spirit or scope of the invention set forth herein.

What is claimed as new and desired to be secured by Letters Patent of the United States is:

1. A water-absorbing rubber composition comprising (A) a 1,3-diene rubber with a crystal or glass region content of 5–50% when measured at about 25° C. having molecular weight of 50,000 to 1,000,000 and a melting point of the crystal regions of 20°–90° C., and (B) a highly water-absorbing resin dispersed in said rubber, the ratio of mixing said 1,3-diene rubber to said water-absorbing resin ranging from 10–300 parts by weight of resin per 100 parts by weight of said rubber, said resin being a product of crosslinking of a polymer which contains as a monomer at least 40 mole percent of an α,β-unsaturated compound containing 1 or 2 groups each selected from the class consisting of a carboxyl group and a group convertible to a carboxyl group with at least one crosslinking agent selected from the group consisting of a polyfunctional epoxy compound containing at least two epoxy groups and a polyamine having a molecular weight or 60–5000 and represented by a general formula $H-(NH-CH_2-CH_2-)_nNH_2$ wherein n is an integer of 1 to 110, said resin being in the form of a powder capable of passing through a 20-mesh Tyler screen and absorbing 20-500 times its own weight of distilled water.

2. The water-absorbing rubber composition of claim 1, wherein said 1,3-diene rubber with a crystal region content as measured at an ordinary temperature of 5-50% is chloroprene rubber.

3. The water-absorbing rubber composition of claim 2, wherein said chloroprene rubber has a crystal region content as measured at an ordinary temperature of 15-35%.

4. The composition of claim 1, wherein said 1,3-diene rubber is a block copolymer of the type A-B-A wherein A is a polymer segment composed of a monovinyl-substituted aromatic compound having a glass transition temperature of at least 70° C. and a degree of polymerization of 10-2,500 and B is a noncrystalline polymer segment composed of a 1,3-diene having a degree of polymerization of 500-15,000, and said A segments amounting to 5-50% of the whole rubber component.

5. The water-absorbing rubber composition of claim 1, wherein the highly water-absorbing resin is a polyfunctional epoxy compound-crosslinked reaction product of a maleic anhydride-containing copolymer and a basic substance.

6. The water-absorbing rubber composition of claim 5, wherein the maleic anhydride-containing copolymer is an alpha-olefin-maleic anhydride copolymer.

7. The water-absorbing rubber composition of claim 6, wherein the alpha-olefin-maleic anhydride copolymer is an alternating compolymer of isobutylene and maleic anhydride.

8. The water-absorbing rubber composition of claim 5, wherein the maleic anhydride-containing copolymer is a copolymer of maleic anhydride and at least one comonomer selected from the group consisting of styrene, vinyl acetate, methyl vinyl ether, acrylic acid ester, methacrylic acid ester and acrylonitrile.

9. The composition of claim 1, wherein said resin is a polyamine crosssslinked reaction product of a maleic anhydride-containing copolymer and a basic substance making it more hydrophilic.

10. The composition of claim 9, wherein said maleic anhydride-containing copolymer is an alphaolefin-maleic anhydride copolymer.

11. The composition of claim 10, wherein said alpha-olefin-maleic anhydride copolymer is an alternating copolymer of isobutylene and maleic anhydride.

12. The water-absorbing rubber composition of claim 9, wherein the maleic anhydride-containing copolymer is a copolymer of maleic anhydride and at least one comonomer selected from the group consisting of styrene, vinyl acetate, methyl vinyl ether, acrylic acid ester, methacrylic acid ester and acrylonitrile.

13. The water-absorbing rubber composition of claim 1, wherein the highly water-absorbing resin is a polyacrylic acid alkali metal salt crosslinked with at least one crosslinking agent selected from the group consisting of a polyfunctional epoxy compound and a polyamine.

14. The water-absorbing rubber composition of claim 1, wherein the polyfunctional epoxy compound is a glycerol diglycidyl ether.

15. The composition of claim 1, wherein said polyamine is polyethyleneimine having a molecular weight of not more than 5,000.

16. The composition of claim 1, wherein said resin can absorb 50-300 times its own weight of distilled water.

17. The composition of claim 1, wherein the amount of said resin (B) is 10-300 parts by weight per 100 parts by weight of the 1,3-diene rubber (A) with a crystal or glass region content of 5-50% when measured at about 25° C.

18. A water leak stopper predominantly composed of water-absorbing rubber composition of claim 1.

* * * * *